United States Patent
Lazides

Patent Number: 5,701,843
Date of Patent: Dec. 30, 1997

[54] PET MOBILE

[76] Inventor: Gus Lazides, 268 93rd St., Brooklyn, N.Y. 11209

[21] Appl. No.: 722,992

[22] Filed: Sep. 30, 1996

[51] Int. Cl.$^6$ .................................................. A01K 1/03
[52] U.S. Cl. ........................ 119/496; 119/512; 190/18 A
[58] Field of Search ............................ 119/496, 497, 119/512, 482; 190/18 A

[56] References Cited

U.S. PATENT DOCUMENTS

| | | | |
|---|---|---|---|
| 1,381,892 | 6/1921 | Bute | 119/512 |
| 2,790,414 | 4/1957 | Rossow | 119/497 |
| 2,821,165 | 1/1958 | Wright | 119/482 |
| 2,925,283 | 2/1960 | Stilger | 190/18 A |
| 3,490,417 | 1/1970 | Swinney | 119/19 |
| 4,024,600 | 5/1977 | Feinberg et al. | 190/18 A |
| 4,217,675 | 8/1980 | Haft | 190/18 A |
| 4,422,212 | 12/1983 | Sheiman et al. | 190/18 A |
| 4,773,123 | 9/1988 | Yu | 190/18 A |
| 4,928,800 | 5/1990 | Green et al. | 190/18 A |
| 4,977,857 | 12/1990 | Slawinski | 119/19 |
| 5,113,793 | 5/1992 | Leader et al. | 119/19 |
| 5,253,612 | 10/1993 | Goetz | 119/496 |
| 5,280,767 | 1/1994 | Goetz | 119/496 |
| 5,283,962 | 2/1994 | Humann | 34/202 |
| 5,469,945 | 11/1995 | Jserng | 190/18 A |

FOREIGN PATENT DOCUMENTS

| | | | |
|---|---|---|---|
| 2245543 | 1/1992 | United Kingdom | 190/18 A |

*Primary Examiner*—Paul J. Hirsch
*Attorney, Agent, or Firm*—Joseph H. McGlynn; Patent & Trademark Services, Inc.

[57] ABSTRACT

A pet carrier with adequate ventilation for even a large animal. The carrier has a handle which can be folded to conserve space and retractable wheels which can be placed in a down position when moving the carrier with the pet inside, or can be placed in an up or inactive position when mobility is not necessary or when it is desired to maintain the carrier in a stationary position.

4 Claims, 2 Drawing Sheets

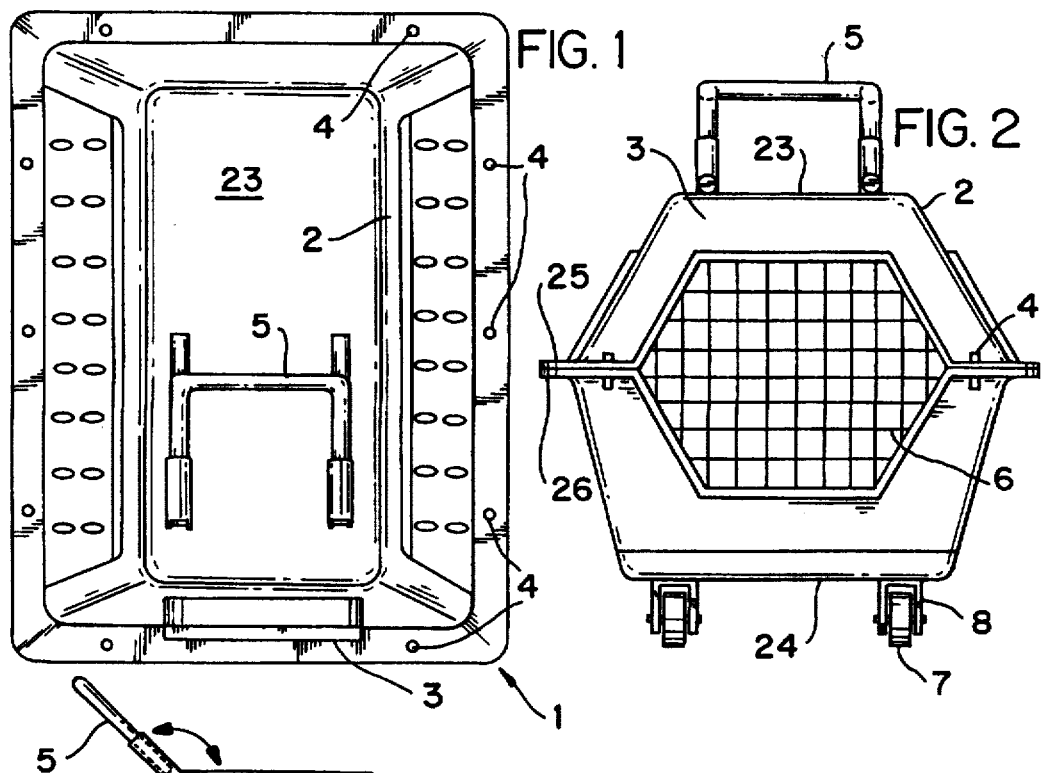
FIG. 1
FIG. 2
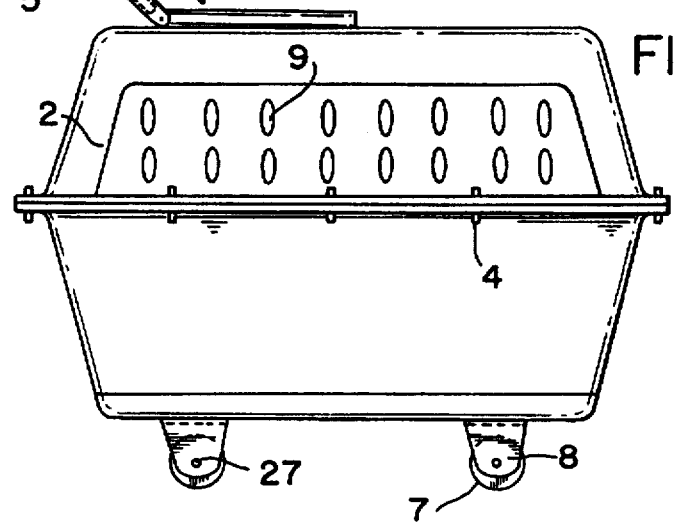
FIG. 3
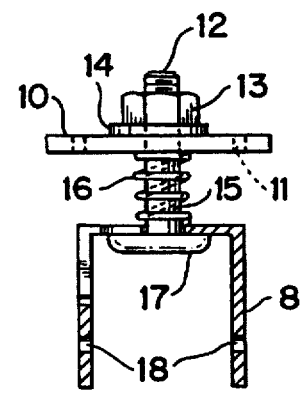
FIG. 4
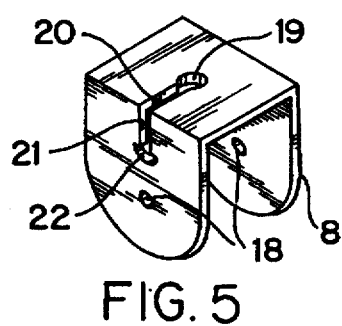
FIG. 5
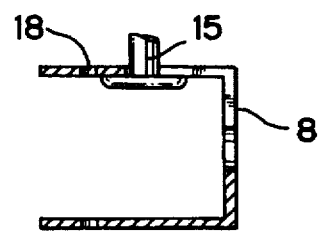
FIG. 6

5,701,843

PET MOBILE

BACKGROUND OF THE INVENTION

This invention relates, in general, to animal cages, and, in particular, to a mobile carrier for pets and other animals.

Many people who travel also own pets. If they fly they have to place their pet into a mobile kennel as required by airline rules and regulations. Other modes of travel would also be made easier if the pet could be placed in a convenient, mobile kennel. Many locations such as shopping malls or tourist attractions, parks or beaches have strict regulations regarding pets. Some prohibit pets from being walked even if the pet is on a leash. Even with the pet on a leash, there is danger the pet might get loose or have an altercation with another animal.

The current options for pet owners are limited. One option is to leave the pet in a vehicle with the windows opened slightly. However, even then there is not adequate ventilation for the pet.

Another option is to take the pet with the owner. This is impractical with large animals and can be tiresome with small pets. Another option is to leave the pet home or at a kennel. None of the above options are entirely satisfactory.

Consequently, there is need for a device to make it easy, safe and convenient for a pet to accompany an owner.

DESCRIPTION OF THE PRIOR ART

In the prior art various types of pet carriers have been proposed. For example, U.S. Pat. No. 3,490,417 discloses a pet carrier made of molded material comprising a top and bottom portion that are secured together. However there is no provision for easy mobility of the carrier since the owner would have to carry it, thereby making it suitable only for small pets.

U.S. Pat. No. 4,977,857 discloses a flexible bag-like carrier with wheels and a pulling strap so an owner does not have to carry the pet. This is, again suitable for small animals and will not be sturdy enough for large animals.

U.S. Pat. No. 5,113,793 disclose an enclosed cart with wheels and a handle for maneuvering the cart. This type of cart would be large enough and mobile enough for large animals, but because of its size and fixed wheels and handle would be awkward to store on trips when the pet is not using the carrier.

U.S. Pat. No. 5,283,962 discloses a cart on wheels with a mechanism for drying and warming calves.

SUMMARY OF THE INVENTION

The present invention consists of a pet carrier with adequate ventilation for even a large animal. The carrier has a handle which can be folded to conserve space and retractable wheels which can be placed in a down position when moving the carrier with the pet inside, or can be placed in an up or inactive position when mobility is not necessary or when it is desired to maintain the carrier in a stationary position.

It is an object of the present invention to provide a new carrier for pets that can be large enough for large animals.

It is an object of the present invention to provide a carrier for pets that can be easily moved even with a large animal inside.

It is an object of the present invention to provide a carrier for pets that can be held in a safe, stationary position.

These and other objects and advantages of the present invention will be fully apparent from the following description, when taken in connection with the annexed drawings.

BRIEF DESCRIPTION OF THE DRAWINGS

FIG. 1 is a top view of the present invention.

FIG. 2 is a front view of the present invention.

FIG. 3 is a side view of the present invention.

FIG. 4 is a view of the retractable wheel assembly.

FIG. 5 is a view of the retractable wheel bracket.

FIG. 6 is a view of the wheel bracket in the retracted position.

DESCRIPTION OF THE PREFERRED EMBODIMENT

Figure 7:
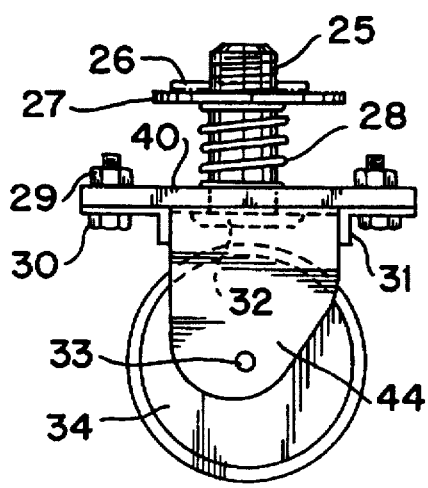
FIG. 7 is a side view of another wheel assembly.

Referring now to the drawings in greater detail, FIG. 1 shows a top view of the carrier 1 with the retractable handle 5 in the folded position. The carrier has a top 23, sides 2, and ends 3. As shown in FIG. 2 the carrier is composed of two pieces, a top 23 and a bottom 24 which are held together by any conventional fasteners 4 such as, but not limited to, screws, bolts and studs. The top and bottom sections are each provided with circumferential mating flanges 25 and 26, respectfully. The fasteners 4 extend through the flanges as shown in FIG. 2. The sections are preferably made of moldable plastic, however they may be made of other suitable materials such as, but not limited to, light metal.

As shown in FIG. 1, the top of the upper section 23 has a handle 5 attached thereto by any conventional means such as bolts or screws. The handle can be folded flat onto the top 23 in order to conserve space or to make the carrier easier to handle or store when it is not being used to carry a pet. As shown in FIG. 3, the handle can be unfolded when needed to move the carrier when a pet is inside.

The ends 3, as shown in FIG. 2 have a screen or other open area 6 to allow air to enter the inside of the carrier. The screen or other open area 6 can be made as a single piece which is attached to one of the top or bottom pieces, or it can be made as two pieces one of which is attached to the top and one of which is attached to the bottom. When the top and bottom are joined the two pieces of screen will be joined also. The sides 2, as shown in FIG. 3, also have ventilation openings 9. The openings 9 are shown as apertures in the top, however, they could be placed on the bottom or on the top and bottom. Also, the apertures could be a screen, similar to the screen 6, instead of apertures.

Secured to the bottom of the carrier are at least four wheel assemblies comprising flanges 8 and wheels 7. A plate 10, as shown in FIG. 4, can be secured to the floor of the carrier by screws or bolts(not shown) passing through apertures 11. The flange 8 is secured to the plate 10 by means of a threaded stud 15 which passes through an aperture 19 in the top of the flange 8 and through a similar aperture in the plate 10. A spring 16 is secured around the stud 15 and is positioned between the plate 10 and the flange 8. A head 17 on the stud prevents the stud from passing through the top of the flange 8. A nut 13 and washer 14 are used to secure the stud 15 to the plate 10. The bottom of the carrier will be provided with an aperture or recess (not shown) which receives the end 12 of the stud 15, the nut 13 and the washer 14.

Aperture 19 in the top of the flange 8 communicates with a slot 20, as shown in FIG. 5, which extends across the top of flange 8 and communicates with another slot 21 in the side of the flange 8. The slot 21 ends in an aperture 22 with the shape of a truncated triangle. Also included in the sides of the flange 8 are apertures 18 which will receive the axles 27 which are secured to wheels 7. The apertures 19, and 22, and the slots 20 and 21 cooperate with the stud 15, spring 17, plate 10 and nut 13 to allow the wheels to pivot from a first position in which the wheels are in the extended position shown in FIG. 3 to a folded or retracted position. When in a folded position, the carrier will not be able to roll and will remain in place. This position can be used when storing the carrier or when the owner desires to place the carrier with the pet inside in a position from which it will not move.

With the wheels in the extended position, they can be moved into the folded position by pushing up on the flange 8. This will compress the spring 16 and free the head 17 of the stud from the underside of the top of the flange. The flange may then be moved laterally which will move the stud into the slot 20 and when it reaches the slot 21 in the side of the flange 8, the flange may be rotated in order to move the stud into the slot 21. The flange will continue to move until the stud reaches aperture 22. The flange will then be released and the spring 16 will force the head 17 against the inside of the side of the flange 8, as shown in FIG. 6. In this position the wheels will be rotated 90° from the position shown in FIG. 3 and will not contact the ground. Instead the side of the flange opposite from the side having the aperture 22 will engage the ground and keep the carrier from moving.

FIG. 7 shows another embodiment of a wheel assembly that can be used with the present invention. The assembly has a post 25 with a pin 26 extending through an aperture in the post at one end and an enlarged end 32 on the other end. A plate 27 is trapped between pin 26 and a spring 28. The spring rests on plate 40. A pair of nuts 29 and bolts 30 are used to secure a pair of L-shaped plates 31 to the underside of plate 40. A wheel holding frame 44, with a wheel 34 secured to the frame by axle 33, is rotatably held to plate 40 by the bolt 25 and the enlarged head 32. In order to prevent the frame 44 from rotating, the L-shaped plates 31 are held against the left and right side (as seen in FIG. 7) of the frame 44.

Figure 8:
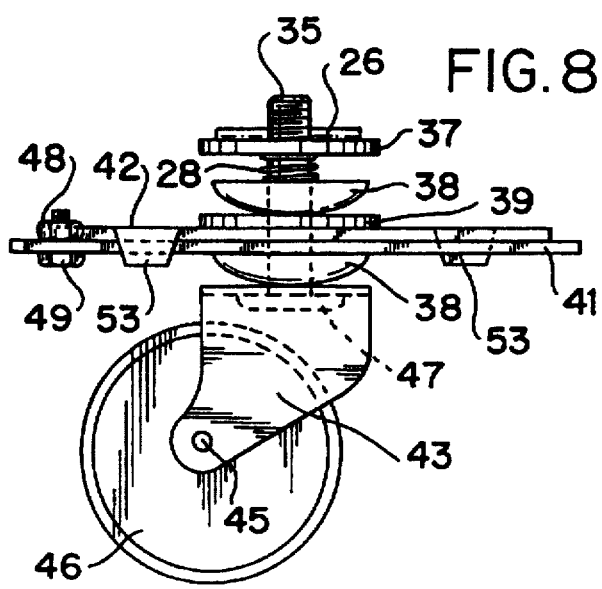
FIG. 8 is a side view of third wheel assembly.
Figure 9:
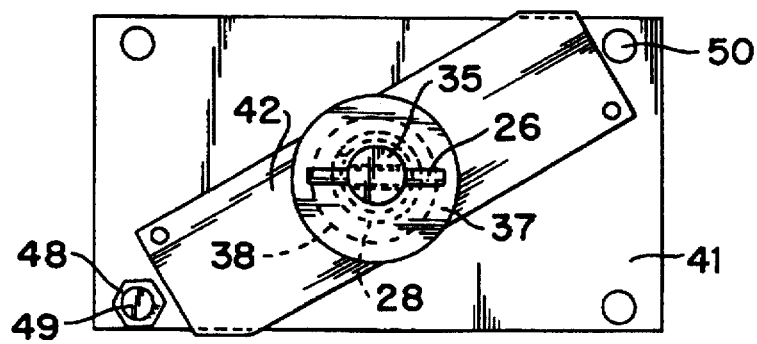
FIG. 9 is a top view of the FIG. 8 wheel assembly.
Figure 10:
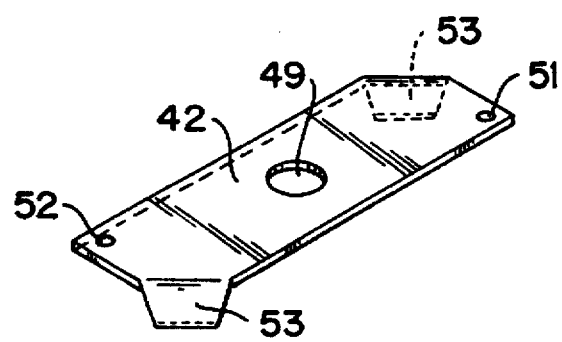
FIG. 10 is a perspective view of the holding plate of the FIG. 8 wheel assembly.

Another wheel assembly is shown in FIGS. 8–10. This assembly has a threaded bolt 35 with a pin 26 extending through an aperture in the bolt at one end and an enlarged end 47 on the other end. A spring 28 is trapped between plate 37 and dished washer 38. The bolt extends through plate 41 which holds the wheel frame 43, to which a wheel 46 is secured by axle 45. The wheel frame is held to plate 41 by the enlarged head 47.

Attached to plate 41 is an anti rotation plate 42 (see also FIG. 10) which prevents the wheel frame from rotating similar to L-shaped plates 31 in the FIG. 7 embodiment. The plate 42 can be secured to plate 41 by a bolt 49 and a nut 48 whose sides engage the plate 42, as shown in FIG. 8, or a bolt 50 can be threaded through an aperture 51 in the plate 42. The plate 42 has flanges 53 which will engage the sides of plate 41 to prevent rotation.

Both embodiments (FIG. 7 and FIG. 8) allow the wheels to be locked so they will not rotate, or by removing plates 31 and 42, the wheels can be allowed to rotate. The user would have the choice of rotating or non-rotating wheels, which ever they prefer.

Although the Pet Carrier and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A carrier for a pet comprising:

upper and lower sections secured together at mating peripheral flanges, when said upper and lower sections are secured together they form a compartment comprised of a front, rear, sides, top and a bottom, ventilation means positioned at least in one of said ends and sides, wheels attached to said bottom, said wheels are movable from a first position in which said wheels engage a supporting surface to a second position in which said wheels do not engage said supporting surface, and wherein said wheels are secured to a U-shaped flange having a top and a pair of depending arms, said top having an aperture and a first slot communicating with said aperture, one of said arms having a second slot communicating with said first slot, a stud having a first end and means securing said first end to said bottom of said carrier, and a second end attached to said top of said U-shaped flange, resilient means secured between said top of said U-shaped flange and said means securing said first end to said bottom of said carrier.

2. The carrier as claimed in claim 1, wherein a foldable handle is secured to said top of said carrier.

3. A carrier for a pet comprising:

upper and lower sections secured together at mating peripheral flanges, when said upper and lower sections are secured together they form a compartment comprised of a front, rear, sides, top and a bottom, ventilation means positioned at least in one of said ends and sides, wheels and a wheel frame attached to said bottom, said wheel frame being secured to a support plate and being normally rotatable with respect to said support plate, means attached to said support plate for preventing said wheel frame from rotating, said means attached to said support plate for preventing said wheel frame from rotating comprising at least a pair of L-shaped plates attached to an underside of said support plate, said L-shaped plates engaging said wheel frame and thereby preventing said wheel frame from rotating.

4. A carrier for a pet comprising:

upper and lower sections secured together at mating peripheral flanges, when said upper and lower sections are secured together they form a compartment comprised of a front, rear, sides, top and a bottom, ventilation means positioned at least in one of said ends and sides, wheels and a wheel frame attached to said bottom, said wheel frame being secured to a support plate and being normally rotatable with respect to said support plate, means attached to said support plate for preventing said wheel frame from rotating, said means attached to said support plate for preventing said wheel frame from rotating comprising at least a U-shaped plate having a first portion with a pair of arms depending from said first portion, attached to a surface of said support plate, said pair of arms engaging said wheel frame and thereby preventing said wheel frame from rotating.

* * * * *